United States Patent
Volach

(10) Patent No.: US 9,432,317 B2
(45) Date of Patent: Aug. 30, 2016

(54) SURVEY SAMPLING PRIOR TO MESSAGE PUBLISHING

(71) Applicant: PECAN TECHNOLOGIES INC., Tortola (VG)

(72) Inventor: Ben Volach, Haifa (IL)

(73) Assignee: PECAN TECHNOLOGIES INC., Tortola (VG)

(*) Notice: Subject to any disclaimer, the term of this patent is extended or adjusted under 35 U.S.C. 154(b) by 0 days.

(21) Appl. No.: 14/404,698

(22) PCT Filed: Jun. 3, 2013

(86) PCT No.: PCT/IB2013/054554
§ 371 (c)(1),
(2) Date: Dec. 1, 2014

(87) PCT Pub. No.: WO2013/182965
PCT Pub. Date: Dec. 12, 2013

(65) Prior Publication Data
US 2015/0120846 A1    Apr. 30, 2015

Related U.S. Application Data

(60) Provisional application No. 61/656,020, filed on Jun. 6, 2012.

(51) Int. Cl.
*G06F 15/16* (2006.01)
*H04L 12/58* (2006.01)
(Continued)

(52) U.S. Cl.
CPC ......... *H04L 51/043* (2013.01); *G06Q 30/0243* (2013.01); *H04L 67/24* (2013.01)

(58) Field of Classification Search
CPC .. G06Q 30/00; G06Q 30/0203; G06Q 30/02; G06Q 30/0243; G06F 15/16; H04L 51/04; H04L 12/581; H04L 67/24
See application file for complete search history.

(56) References Cited

U.S. PATENT DOCUMENTS 6,493,703 B1 * 12/2002 Knight .............. G06F 17/30702
7,356,567 B2    4/2008 Odell et al.
(Continued)

FOREIGN PATENT DOCUMENTS

EP    1624613 A1    2/2006
WO    2007/069346 A1    3/2009
(Continued)

OTHER PUBLICATIONS

RFC 3920, RFC 3921, RFC 3922, RFC 3923, RFC 4854, RFC 4974, RFC 5122, RFC 3428, RFC 3856, RFC 3857, RFC 3858 and RFC 4825; Available from the Internet Engineering Task Force (IETF) at http://tools.ietf.org/html.
(Continued)

*Primary Examiner* — Aftab N. Khan
(74) *Attorney, Agent, or Firm* — Mark David Torche; Patwrite LLC

(57) ABSTRACT

Systems and methods for surveying presence messages prior to widespread distribution-publishing are disclosed. The system includes a presentity module and surveying server, specifying a parameter for subsequent publishing and compiling a notification list of watchers for participation in a given survey. The system further includes a presence-notification server, presence-messaging user agent module and a client feedback module, collecting information regarding interacting with the message in and transmitting the information to the surveying server. The method includes composing a message, specifying at least one parameter for subsequent publishing, compiling a notification list of watchers for participation in a given survey, selectively notifying the message to the watchers in the notification list, viewing the message notified to the watchers in notification list and interacting with the message. The method further includes collecting feedback information regarding the interacting with the message and transmitting this information to the surveying server.

16 Claims, 1 Drawing Sheet

(51) Int. Cl.
*H04L 29/08* (2006.01)
*G06Q 30/02* (2012.01)

(56) References Cited

U.S. PATENT DOCUMENTS

| | | | |
|---|---|---|---|
| 7,895,263 | B1 | 2/2011 | Kirchmeier et al. |
| 7,954,124 | B2 | 5/2011 | Rambo |
| 2002/0124247 | A1* | 9/2002 | Houghton .......... H04N 5/44543 725/9 |
| 2002/0188777 | A1* | 12/2002 | Kraft ...................... G06Q 10/10 710/100 |
| 2004/0128183 | A1* | 7/2004 | Challey .............. G06Q 30/0203 705/7.32 |
| 2004/0172269 | A1 | 9/2004 | Bella et al. |
| 2005/0188019 | A1 | 8/2005 | Mittelstaedt et al. |
| 2006/0026256 | A1* | 2/2006 | Diddee .................. H04L 51/04 709/207 |
| 2006/0155567 | A1 | 7/2006 | Walker et al. |
| 2008/0119131 | A1 | 5/2008 | Rao |
| 2009/0075738 | A1 | 3/2009 | Pearce |
| 2011/0270650 | A1 | 11/2011 | Pavagadhi et al. |
| 2012/0022905 | A1 | 1/2012 | Meyer et al. |

FOREIGN PATENT DOCUMENTS

| | | |
|---|---|---|
| WO | 2009/059258 A1 | 5/2009 |
| WO | 2010/133916 A1 | 11/2010 |

OTHER PUBLICATIONS

RFC 3920, RFC 3921, RFC 3922, RFC 3923, RFC 4854, RFC 4974, RFC 5122, RFC 3428, RFC 3856, RFC 3857, RFC 3858 and RFC 4825; Available from the Internet Engineering Task Force (IETF) at http://tools.ietf.org/html/.
XEP-0071 XHTML-IM, Available from XMPP Standards Foundation at http://xmpp.org/extensions/xep-0071.html.
XMPP-CORE-01 Available from XMPP Standards Foundation at http://tools.ietf.org/html/draft-saintandre-XMPP-CORE-01.
sip-xmpp-im-01 Available from XMPP Standards Foundation at http://tools.ietf.org/html/draft-saintandre-sip-xmpp-im-01.
sip-xmpp-chat-03 Available from XMPP Standards Foundation at http://tools.ietf.org/html/draft-saintandre-sip-xmpp-chat-03.
xmpp-presence-02 Available from XMPP Standards Foundation at http://tools.ietf.org/html/draft-saintandre-sip-xmpp-presence-02.
Instant Messaging and Presence Service (IMPS), Presence & Availability (PAG) and Messaging (MWG) Parlay X Web Services API standards Available from Open Mobile Alliance standards: http://www.parlayx.com.
A/B testing. (Nov. 12, 2014). In Wikipedia, The Free Encyclopedia. Retrieved 07:36, Nov. 24, 2014, from http://en.wikipedia.org/w/index.php?title=A/B_testing&oldid=633496882.

* cited by examiner

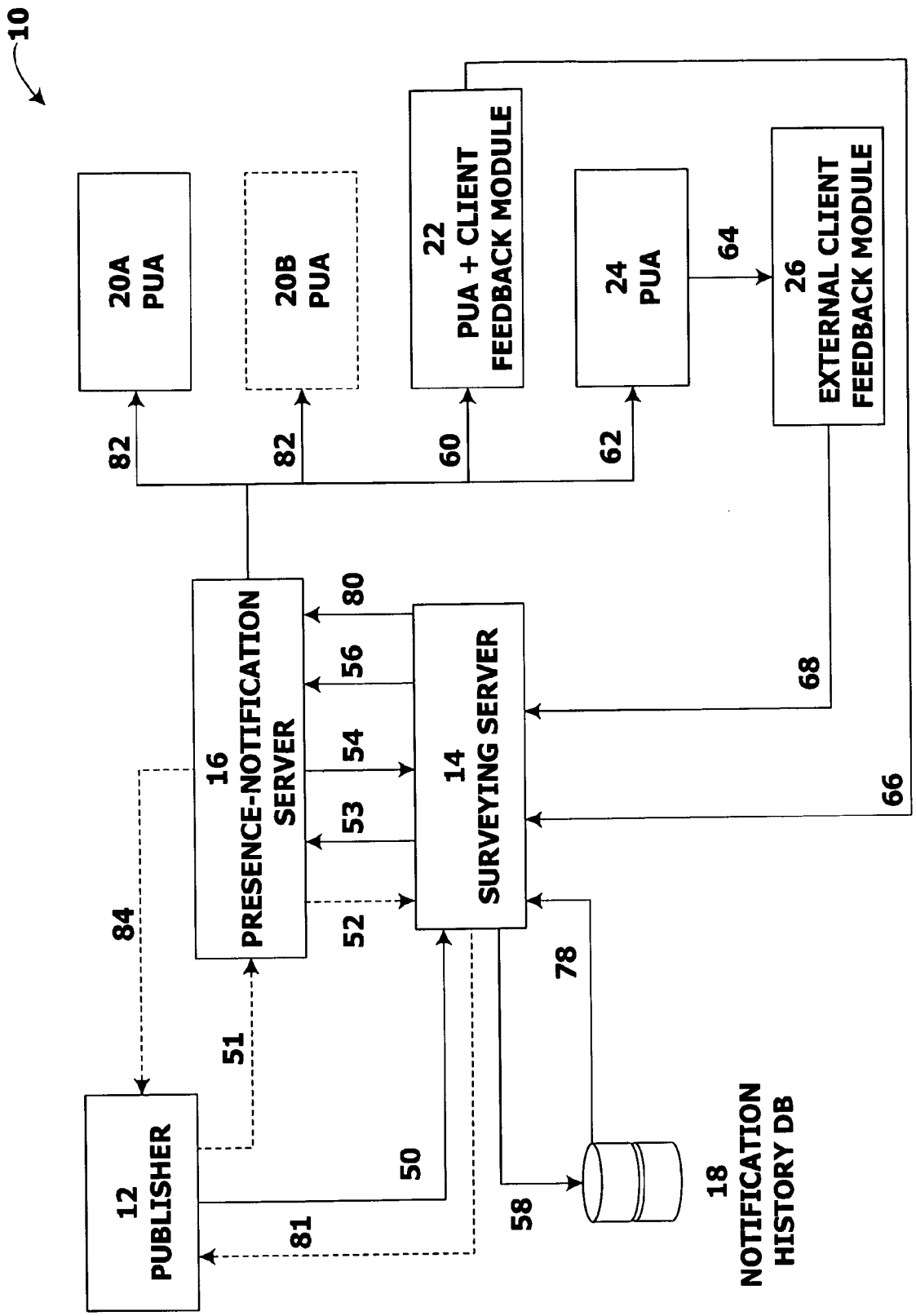

SURVEY SAMPLING PRIOR TO MESSAGE PUBLISHING

CROSS-REFERENCE TO RELATED APPLICATIONS

This application is national phase of international application PCT/IB13/054554, filed 3 Jun. 2013. This application claims priority from U.S. provisional application 61/656,020 filed 6 Jun. 2012, the contents of which are incorporated herein by reference.

TECHNICAL FIELD

In general, the present invention pertains to the arts of telecommunications and/or computer networking. In particular, the invention relates to systems and methods systems and methods of automated surveying and publishing, using the infrastructure of presence messaging systems.

BACKGROUND ART

RFC 3920, RFC 3921, RFC 3922, RFC 3923, RFC 4854, RFC 4974, RFC 5122, RFC 3428, RFC 3856, RFC 3857, RFC 3858 and RFC 4825; available from the Internet Engineering Task Force (IETF) at http://tools.ietf.org/html/

XMPP Standards Foundation—XEP-0071 XHTML-IM, http://xmpp.org/extensions/xep-0071.html; xmpp-core-01 http://tools.ietf.org/html/draft-saintandre-XMPP-CORE-01; sip-xmpp-im-01 http://tools.ietf.org/html/draft-saintandre-sip-xmpp-im-01; sip-xmpp-chat-03 http://tools.ietf.org/html/draft-saintandre-sip-xmpp-chat-03; xmpp-presence-02 http://tools.ietf.org/html/draft-saintandre-sip-xmpp-presence-02.

Open Mobile Alliance standards: Instant Messaging and Presence Service (IMPS), Presence & Availability (PAG) and Messaging (MWG). Parlay X Web Services API standards http://www.parlayx.com Comparative surveying-publishing state of the art is represented inter alia by a method known as a/b testing or bucket testing, disclosed at http://en.wikipedia.org/wiki/a/b testing and elsewhere.

It is believed that relevant state of the art is represented by US patent publications No: US2009075738, US2012022905, US2011270650, US2005188019, US2006155567, US2008119131 and US2004172269, as well as by international patent publications No: WO2007069346 and WO2010133916.

DEFINITIONS

Presence messages or messaging, as referred to herein, should be understood as encompassing any type of information shared on a computer network and particularly transmitted over cellular networks and/or wide and local area computer networks and/or the Internet, otherwise also known in the art as data networks or telecommunications networks which allow computers to exchange data, using the infrastructure of presence information sharing systems known in the art and set forth in a more detail in inter alia in RFC 2778. Components of presence messages as referred to herein inter alia include: text, alphanumeric data, audio files, video files, graphics and hyperlinks.

Open Mobile Alliance (OMA)—Instant Messaging and Presence Service (IMPS) Presence & Availability (PAG) and Messaging (MWG), standards collection, XMPP standards collections referred to herein include: RFC 3920, RFC 3921, RFC 3922, RFC 3923, RFC 4854, RFC 4974 and RFC 5122. SIMPLE—Session Initiation Protocol for Instant Messaging and Presence standards' collection as referred to herein includes: RFC 3428, RFC 3856, RFC 3857, RFC 3858 and RFC 4825.

Whenever the term "server". "agent" or "module" is used herein, it should be construed as a computer program, including any portion or alternative thereof, e.g. script, command, etc., and/or a hardware component/s, including configurations or assemblies thereof, such computer storage media, computer micro-processors and operative memory as well as any combination of the former with the latter.

The term "integrated" shall be inter alia construed as—operable on the same machine and/or executed by the same computer program. Depending on the actual deployment of the method, its implementation and topology, integration of agents and/or integration into modules as well as the terms "transfer", "relaying", "transmitting", "forwarding", "retrieving", "accessing", "pushed" or similar refer to any interaction between agents via methods inter alia including: function calling, API (Application Programming Interface), IPC (Inter-Process Communication), RPC (Remote procedure call) and/or communicating using of any standard or proprietary protocol, such as SMTP, IMAP, MAPI, OMA-IMPS, OMA-PAG, OMA-MWG, SIP/SIMPLE, XMPP, SMPP.

DESCRIPTION OF THE DRAWING

The present invention will be understood and appreciated more comprehensively from the following detailed description taken in conjunction with the appended drawings, in which FIG. 1 is a schematic high-level block diagram of several preferred embodiments of the system of the invention implementable for of automated surveying-publishing, using the infrastructure of presence messaging systems. While the invention is susceptible to various modifications and alternative forms, specific embodiments thereof have been shown merely by way of example in FIG. 1. The diagram of FIG. 1 is not necessarily complete emphasis instead being placed upon clearly illustrating the principles underlying the present invention.

DETAILED DESCRIPTION OF EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

In accordance with some preferred embodiments, the system of the present invention is dedicated for initial surveying and subsequent publishing of presence messages, via the infrastructure of presence messaging systems, known in the art. Presence protocols are standardized, inter alia, in OMA-IMPS, OMA-PAG, XMPP and/or SIMPLE standards collections, referred to supra, as well as in proprietary protocols.

In presence messaging the following terminology is typically used in the art in lieu of common one:

1. sender that is an individual or entity that send the presence message is referred to as presentity or publisher;
2. recipient that is an individual or entity that receives the presence message is referred to as watcher;
3. the act of sending a presence message is referred to as publishing;
4. the act of receiving a presence message via a pull step is referred to as fetching;
5. the act of receiving a presence message via a push step is referred to as notifying.

Presence messaging systems, as oppose to Instant Messaging (IM) systems, are typically characterized by: a) frequent publishing of one or more presence attributes by the presentity, b) usually a plurality of watchers, whom are typically subscribed or associated with the presentity, and c) obtainment of the messages by watchers, whom are not subscribed or associated with the presentity, inter alia via fetching step; whereas in IM the messages are typically delivered to the recipient via push step. There is a particular type of a presence attribute, which is often colloquially referred to as status.

In accordance with some embodiments of the present invention, reference is now made to FIG. 1, showing surveying and publishing system 10. System 10 embodies an exemplary surveying and publishing system for presence messages. System 10 comprises a presentity module, referred to as publisher 12. Publisher 12 typically comprises a sending terminal, which is a message user agent, frequently referred at the colloquial language as client. Publisher 12 is optionally a server-based client, integrated with presence-notification server 16. Publisher 12 is used for the composition of the presence messages and formatting thereof. Publisher 12 is used for the composition and/or formatting of presence messages subject to the surveying, as well as optionally for the composition and/or formatting of presence messages subject to the final publishing.

In some embodiments, wherein a deterministic surveying-publishing is implemented, publisher 12 composes a singular presence message, intended for initial surveying and subsequent deterministic publishing. In the instance of deterministic surveying, publisher 12 defines a set of selection parameters for the participants in the survey and a set of threshold parameters for publishing of the message. Deterministic surveying-publishing, as referred to herein, relates to a publishing method, wherein a message is eventually published to a given watcher based on deterministically meeting a set threshold parameter.

In some embodiments, wherein a comparative surveying-publishing is implemented, publisher 12 composes a plurality of presence messages, intended for initial surveying and subsequent comparative publishing. In the instance of comparative surveying, publisher 12 defines a set or optionally a plurality of sets of selection parameters for the participants in the comparative surveys and at least one comparative parameter for deciding on publishing of a given message. Comparative surveying-publishing, as referred to herein, relates to a publishing method, wherein a message is eventually published to a given watcher upon exceeding in the score of at least one parameter in at least one survey, as compared to the score of the same parameter in at least one another survey. Accordingly, at least two surveys have to be performed in order to exercise the comparative surveying-publishing. Preferably more than two surveys are performed in order to exercise the comparative surveying-publishing. The group and/or sub-group construction as well as comparing of parameters in comparative surveying-publishing is achievable by implementing the statistic method of a/b testing or bucket testing, known in the art.

Upon completing the composition and/or formatting of a presence message intended for initial surveying, publisher 12 transmits the message to surveying server 14, in the direction indicated by arrow 50. The presence message transmitted as indicated by arrow 50, alongside the body of the presence message presented to the watcher, comprises metadata that specifies the selection parameters for the participants in the survey and at least one deterministic and/or comparative parameter for subsequent publishing of a message.

In some embodiments, publisher 12 transmits the message directly to presence-notification server 16, in the direction indicated by arrow 51. The presence message transmitted as indicated by arrow 51, alongside the body of the presence message presented to the watcher, comprises metadata that specifies the selection parameters for the participants in the survey and at least one deterministic and/or comparative parameter for subsequent publishing of a message. Presence-notification server, as referred to herein, is a presence server furnished with capabilities of selectively publishing a message to at least one defined watcher. It is noted that the watcher does not have to actively subscribe to the presentity but rather could be implicitly subscribed by the surveying and publishing system and/or by an external presence-publish server.

Upon receiving a presence message intended for initial surveying together with the metadata specifying the selection parameters for the participants in the survey, submitted by publisher 12 in the direction indicated by arrow 50, surveying server 14 inquires presence-notification server 16 for a list of watchers the attributes of which currently meet the selection parameters for the participants for a given survey, as indicated by arrow 53. Exemplary attributes for selection parameters include the intrinsic characteristics, such as gender and age of the watcher, transient characteristics, such as geographical location of the watcher, as resolved form the internet protocol address (IP address) and/or geographical location resolved from GPS, as well as commercial characteristics, such as purchasing history, consumer club membership, etc.

Presence-notification server 16, inquired as indicated by arrow 53, compiles a list of watchers, the attributes of which currently attend the selection parameters for the participants for the given survey. Presence-notification server 16 thereafter screens the list of watchers, the attributes of which currently attend the selection parameters for the participants for the given survey, for watchers the presence message user agent of which comprises or accosted with a client feedback module, as elaborated infra. Alternatively or additionally presence-notification server 16 screens the list of watchers which currently attend the selection parameters for the participants for the given survey, for watchers from a predefined list watchers who are recorded as participants in surveys and/or participants in previous automated surveys, stored on presence-notification server 16 and/or notification history database 18. The screened list of watchers which currently attend the selection parameters for the participants for the given survey as well as the presence message user agent of which comprises or accosted with a client feedback and/or are from a predefined list watchers and/or participants in previous automated surveys constitutes the list of the intended participants for the current survey, hereinafter referred to as notification list. It is noted that in some embodiments no screening is performed and the notification list is a mere list of watchers which currently meet the selection parameters for the participants for the given survey.

The notification list for the current survey is transmitted to surveying server 14, as indicated by arrow 54. In some embodiments, presence-notification server 16 returns a mere list of watchers which currently attend the selection parameters for the participants for the given survey, as indicated by arrow 54; whereas surveying server 14 applies screening for watchers the presence message user agent of which comprises or accosted with a client feedback and/or are from a predefined list watchers and/or participants in previous automated surveys and subsequently generates the notification list. Alternatively or additionally parameters for building notification list are obtained from external source and/or from notification history database 18. It is noted that in some instances of comparative surveying-publishing a plurality of notification lists is optionally generated, based on difference in selection parameters of the watchers, which represent different or heterogeneous survey groups; whereas in other instances of comparative surveying-publishing a plurality of notification lists are optionally generated, based on identity and/or similarity of the selection parameters, which represent sub-divisions or sub-groups of an homogeneous survey group.

In some embodiments, publisher 12 transmits the message directly to presence-notification server 16, as indicated by arrow 51. The presence message is optionally forwarded to surveying server 14, as indicated by arrow 52, with the metadata thereof; whereas the notification list or mere list of watchers which currently attend the selection parameters for the participants for the given survey, is typically provided by presence-notification server 16, as indicated by arrow 54, either upon injury by surveying server 14, as indicated by arrow 53 or automatically after or alongside forwarding the presence message to surveying server 14, as indicated by arrow 52. It is noted that in some instances of comparative surveying-publishing a plurality of notification lists are optionally generated, based on difference or identity/similarity of the selection parameters.

Upon receiving and/or generating the notification list, surveying server 14 publishes the presence message of the given survey to presence-notification server 16, as indicated by arrow 56. Typically upon publishing to presence-notification server 16, surveying server 14 stores a copy of the presence message respectively alongside the notification list therein and/or at notification history database 18, as indicated by arrow 58. Thereafter presence-notification server 16 performs notifying of the presence message to the watchers in notification list, hereinafter referred to as the survey group, via a push step, as indicated by arrow 60 and 62. Alternatively or additionally the presence message is fetched by the watchers in survey group, via a pull step, as indicated by arrow 60 and 62.

The watchers in the survey group comprise respective receiving terminals, which are presence-messaging user agents (PUA), frequently referred to at the colloquial language as clients, such as exemplary PUA 22 and 24. The PUAs of watchers in the survey group, such as exemplary PUAs 22 and 24, are typically either: comprise a client feedback module, as exemplary PUA 22 integrated with client feedback module, or are associated with a client feedback module, as exemplary PUA 24 connected to client feedback module 26.

Alternatively or additionally the PUAs of watchers in the survey group, such as exemplary PUA 24, become associated with a client feedback module for a first time, as elaborated hereunder, which is a characteristic embodiments wherein no screening is performed and the notification list is a mere list of watchers which currently meet the selection parameters for the participants for the given survey. The embodiments wherein the notification list is a mere list of watchers which currently meet the selection parameters for the participants for the given survey are useful for building-up from scratch the aforementioned predefined lists of watchers who are recorded participants of surveys, implementable for the aforesaid screening.

Upon receiving the message, whether by fetching or notifying, the watchers in the survey group interact with the message, via the PUAs thereof, such as exemplary PUAs 22 and 24. The term interact or interaction with the message, as referred to herein, is to be construed as including any action, whether active or passive, exerted directly on the message or indirectly thereto, which may pertain to a qualitative or quantitative value. Examples of passive interactions exerted directly with the message include: ignoring the message and not opening the message in general or specifically not opening the message as a result of being in physical activity or condition such as cycling, running, driving, sleeping, busy, eating, watching a movie, on a call. The system preferably to take into account various relative parameters, such as the notification load that may result in a different behavior pattern. For example a person received 10 notifications within the last hour and interacts with only a few of them. Another example is low battery state, due to which the user might ignore the message.

Examples of active interactions exerted directly with the message, as referred to herein, in a non limiting manner include: rejecting the message, deleting the message, opening the message, scrolling through the message body, opening hyperlinks embedded in the message, open any files attached to the message, replying to the message, forwarding the message, performing a copy operation to at least a portion of the message, changing the appearance of the message, changing font size, sharing the message with others, publishing the message, saving the message, ranking the message, etc.

Examples of active interactions exerted indirectly to the message, as referred to herein, in a non-limiting manner include: deleting presentity, blocking the publisher, blacklisting the publisher, opening hyperlinks embedded in the message, opening up an application, powering off the phone. Examples of active conditional interactions exerted indirectly to the message that pertain to a qualitative value include making an online purchase as a result of the message; making a purchase at a physical store using a credit card and getting the related information from the credit card company; examples of active conditional interactions exerted indirectly to the message that pertain to a quantitative value include arrival of the device within a predefined radius of a geographical location, the coordinates of which are specified in the message.

Available data, about the interaction history of a given message, is collected by a client feedback module, such as client feedback module integrated with exemplary PUA 22, or individual client feedback module 26 connected to exemplary PUA 24. A preferred instance of an interaction with the message recorded individual client feedback module 26 by opening a hyperlink embedded in the message, wherein upon opening hyperlink the user is initially directed, as indicated by arrow 64, to a proxy server, such as proxy server comprising client feedback module 26. The latter example is particular useful for associating recipient PUAs with a client feedback module for a first time, by using a mere list of watchers which currently meet the selection parameters for the participants for the given survey as the notification list. The latter example is beneficial for building-up from scratch the aforementioned predefined lists of watchers who are recorded participants of surveys, implementable for the aforesaid screening.

Data about the interaction history with a given message, collected by a client feedback module, such as client feedback module integrated with PUA 22 or individual client feedback module 26, are then reported to surveying server 14, as indicated by arrows 68 and 66, upon accumulating a minimal preset quota of data and/or exceeding a predetermined period of time. It is noticed that the reporting of data about the interaction history is optionally a push step performed by a client feedback module or a pull step performed by surveying server 14.

Upon receiving the reported data about interaction history from a minimal quorum of watchers in the survey group or a plurality of survey groups, in a case of comparative surveying-publishing, surveying server 14 exerts the logic for the decision of whether publishing the message to an indefinite number of end-user watchers, which do not have an integrated or associated client feedback module, based on the survey type and/or the values of the parameters reported data about.

The data about interaction history reported to surveying server 14, as indicated by arrows 68 and 66, may include qualitative and/or quantitative values. Instances of qualitative values, reported to surveying server 14 in the data about interaction history, inter alia include indications of whether the message was opened/read, deleted, scrolled through, replied to, an embedded hyperlink and/or enclosed media file has been opened; whereas instances of quantitative values, reported to surveying server 14 in the data about interaction history, inter alia include indications of how long the message was opened, for how further down it was scrolled and how many of the embedded hyperlinks or enclosed media files have been opened.

The qualitative and/or quantitative values, reported to surveying server 14 in the data about interaction history, are further utilized in the process of exerting the logic for the decision of whether to perform distribution-publishing to an indefinite number of end-user watchers or a defined group of selected watchers. Optionally, watchers having integrated or associated client feedback module, such as watchers with PUAs 20A to 20B are excluded from distribution-publishing to an indefinite number of end-user watchers or a defined group of selected watchers. In some preferred embodiments the notification list of the survey is retrieved from notification history database 18, as indicated by arrow 78, and the participants of the survey are excluded from the aforesaid distribution-publishing to an indefinite number of end-user watchers or a defined group of selected watchers, to avoid publishing the message twice to the same watcher.

In the case of deterministic surveying-publishing, the qualitative and/or quantitative values are compared to respective threshold parameters for publishing of the message, as defined initially by publisher 12, in the metadata of the message. If qualitative and/or quantitative values meet the minimal required quota of respective threshold parameters, the message is published by surveying server 14, as indicated by arrow 80, to presence-notification server 16, optionally alongside a distribution list, which dictates at least one parameter for inclusion in and/or exclusion from selective distribution-publishing by presence-notification server 16, to a defined group of selected watchers. Presence-notification server 16 in turn publishes-distributes the message, as indicated by arrows 82, to an indefinite number of end-user watchers or a defined group of selected end-user watchers. Typically surveying server 14 excludes from the distribution-publishing the watchers which have an integrated or associated client feedback module, such as end-user watchers with PUAs 20A to 20B. Optionally, watchers that have an integrated or associated client feedback module but which have not participated in a given survey are nevertheless get notified, as indicated by arrow 82.

In the case of comparative surveying-publishing, the qualitative and/or quantitative values in first survey group or subgroup are compared to respective values in second survey group or subgroup. If the qualitative and/or quantitative values in first survey group exceed the respective values in second survey group, the message is published, as indicated by arrow 80, to presence-notification server 16, optionally alongside a distribution list, which dictates at least one parameter for inclusion in and/or exclusion from selective distribution-publishing by presence-notification server 16, to a defined group of selected watchers. Presence-notification server 16 in turn publishes-distributes the message, as indicated by arrows 82, to an indefinite number of end-user watchers or a defined group of selected end-user watchers. Typically surveying server 14 excludes from the distribution-publishing the watchers which have an integrated or associated client feedback module, such as end-user watchers with PUAs 20A to 20B. Optionally, watchers that have an integrated or associated client feedback module but which have not participated in a given survey and/or have not participated in a sub-group of a survey are nevertheless notified, as indicated by arrow 82.

It is explicitly noted that the comparative surveying-publishing, as referred to herein, optionally includes comparing respective values among more than two groups of different surveys or among more than two subgroups of a survey.

Upon publishing the message to presence-notification server 16, as indicated by arrow 80, publisher 12 is preferably notified with confirmation of the distribution-publishing of the message to an indefinite number of end-user watchers or a defined group of selected end-user watchers, by surveying server 14, as indicated by arrow 81. Upon reaching the decision not to distribute-publish the message to presence-notification server 16, publisher 12 is preferably notified, by surveying server 14, with a denial of the distribution-publishing to an indefinite number of end-user watchers or a defined group of selected end-user watchers. Upon publishing the message to presence-notification server 16 and/or reaching the decision not to publish the message, publisher 12 is preferably notified, by surveying server 14, with the results of the surveys. Upon publishing the message to presence-notification server 16 and/or reaching the decision not to publish the message, surveying server 14 preferably stores a copy of the presence message respectively alongside the data of the results of the surveys therein and/or at notification history database 18.

In some preferred embodiments, prior to the distribution-publishing of the presence message to an indefinite number of end-user watchers or a defined group of selected end-user watchers, as indicated by arrow 80, surveying server 14 seeks permission from publisher 12, as indicated by arrow 81, and preferably notifying publisher 12, with the results of the surveys.

In some preferred embodiments and optimally upon reaching the decision not to distribute-publish the presence message to an indefinite number of end-user watchers or a defined group of selected watchers, surveying server 14 notifies publisher 12, as to at least one type of statistical analysis of the survey. Consequently, publisher 12 is provided with an option to redefine the selection parameters for watchers in distribution-publishing to a defined group of selected watchers; thereby shaping or reshaping the list of end-user watchers.

In some embodiments, wherein publisher 12 transmits the message directly to presence-notification server 16, as indicated by arrow 51, the seeking of permission from publisher 12, notifying publisher 12 with the results of the surveys, notifying publisher 12 with a denial or confirmation of the distribution-publishing to an indefinite number of end-user watchers or a defined group of users, as indicated by arrow 82, is performed by publisher 12 directly to presence-notification server 16, as indicated by arrow 84.

It is stressed that in the sake of brevity not all actual combinations of modules, agents and/or various other constituents from different configurations and/or embodiments are explicitly disclosed in the specification hereinabove. The emphasis instead has been made on the characteristics of such constituents and functional context thereof. Therefore numerous non-disclosed combinations of modules, agents and/or various other constituents from different configurations and/or embodiments are contemplated by the present disclosure.

The invention claimed is:

1. A survey sampling prior to message publishing system comprising:
   a system for automated and unselective widespread distribution-publishing of presence messages, over a computer network, using a presence network service and without employing instant messaging therefor, characterized in utilizing feedback data of at least one selective publishing over a computer network, performed prior to said widespread distribution-publishing, said system further comprising:
   [a] at least one data storage unit having stored therein:
      [1] a database of potential watchers;
      [2] a notification list of a predefined group of watchers;
      [3] feedback data of interaction of said predefined group of watchers with at least one item of a presence message;
   [b] at least one first computer that is operable as a presentity module comprising a sending terminal, wherein said sending terminal is configured to perform at least one function selected from the group consisting of:
      [1] composition of at least one message subject to initial surveying, and
      [2] composition of at least one message subject to widespread distribution-publishing;
   [c] at least one second computer, coupled to said data storage unit, operable as a surveying server configured to receive said at least one message subject to said initial surveying from said first computer and further to:
      [1] specify at least one parameter for subsequent automated and unselective widespread distribution-publishing of said at least one message subject to said initial surveying, wherein said at least one parameter for said subsequent automated and unselective widespread distribution-publishing of said message is selected from the group consisting of:
         [i] a deterministic parameter, and
         [ii] a comparative parameter;
      [2] compiling said notification list of said predefined group of watchers, wherein an attribute of said watchers in said notification list meets a criterion for participation in a given survey;
   [d] at least one third computer, coupled to said data storage unit and/or said second computer, operable as a selective presence-notification server said presence-notification server is configured to selectively notify said message subject to said initial surveying to said predefined group of watchers in said notification list, using said presence network service;
   [e] a plurality of fourth feedback providing computers, connected by said network to said at least one second computer and said at least one third computer, operable as a plurality of feedback enabled presence-messaging user agents comprising:
      [1] an input network terminal configured to receive said message notified to said predefined group of watchers in said notification list;
      [2] a human accessible interface configured for:
         [i] viewing said message notified to said predefined group of watchers in said notification list; and
         [ii] interacting with said message notified to said predefined group of watchers in said notification list;
      [3] a feedback gathering module configured to collect feedback data regarding said interacting with said message on said human accessible interface;
      [4] an output network terminal configured to transmit said feedback data to said surveying server; and
   wherein said interacting comprises an action, selected from the group consisting of: an active action and passive action; said action is exerted onto said message in a way selected from the group consisting of: directly thereon and indirectly thereto; wherein said action pertains to a value selected from the group consisting of: a qualitative value and quantitative value.

2. The survey sampling prior to message publishing system, as set forth in claim 1, further comprises a presence-notification server that is configured to perform said widespread distribution-publishing.

3. The survey sampling prior to message publishing system, as set forth in claim 1, further comprises a plurality of presence-messaging user agent modules, which are not connected to said client feedback module, said plurality of presence-messaging user agent modules are configured to view said message subject to said widespread distribution-publishing.

4. The survey sampling prior to message publishing system, as set forth in claim 1, further comprises a notification history database.

5. The survey sampling prior to message publishing system, as set forth in claim 1, wherein said message is a combination of a message and metadata, wherein said metadata comprising at least one feedbacking parameter related to said message, to be actively replied by a watcher in said notification list, wherein said interacting comprises interacting with said metadata of said message.

6. The survey sampling prior to message publishing system, as set forth in claim 1, wherein said interacting is at least one action selected from the group consisting of: ignoring said message, rejecting said message, blocking a publisher of said message, blacklisting said publisher, not opening said message, deleting said message, opening said message, scrolling through said message body, opening hyperlinks embedded in said message, open any files attached to said message, replying to said message, forwarding said message, performing a copy operation to at least a portion of said message, changing an appearance of said message, changing font size, deleting said presentity, sharing said message with others, publishing said message, making a purchase as a result of said message, saving said message, ranking said message, opening up an application, arriving within a predefined radius of a geographical location, powering off said presence-messaging user agent module.

7. The survey sampling prior to message publishing system, as set forth in claim 1, wherein said presence-messaging user agent module and said client feedback module are integrated, being operable on a single device.

8. The survey sampling prior to message publishing system, as set forth in claim 1, wherein said client feedback module is external.

9. A method of automated and unselective widespread distribution-publishing of presence information over a computer network, using a presence network service and without employing instant messaging therefor, characterized in utilizing feedback data of at least one selective publishing of presence information, performed prior to said widespread distribution-publishing, said method comprises:
   [a] composing at least one message subject to initial surveying;
   [b] specifying at least one parameter for subsequent automated and unselective widespread distribution-publishing of said at least one message subject to said initial surveying, wherein said at least one parameter for subsequent publishing of said message is selected from the group consisting of:
      [1] a deterministic parameter, and
      [2] a comparative parameter;
   [c] compiling a notification list of a predefined group of watchers, wherein at least one attribute of said watchers in said notification list meets a criterion for participation in a given survey;
   [d] selectively notifying said message subject to said initial surveying to said predefined group of watchers in said notification list, using said presence network service;
   [e] viewing said message notified to said predefined group of watchers in said notification list and interacting with said message notified to said predefined group of watchers in said notification list;
   [f] collecting feedbacking information about said interacting with said message and transmitting said information to a surveying server;
   [g] applying said at least one parameter for subsequent automated and unselective widespread distribution-publishing of said message, upon receiving an amount of said feedbacking information selected from the group consisting of:
      [1] an amount exceeding a predefined minimal quorum of watchers in said notification list;
      [2] an amount exceeding a predefined minimal quota of data; and
   [h] performing said automated and widespread distribution-publishing of said at least one message subject to said initial surveying.

10. The method as set forth in claim 9, wherein said parameter for said subsequent automated and widespread distribution-publishing of said message is said comparative parameter, said method is characterized by:
   [a] said composing comprises composing at least two messages subject to initial surveying;
   [b] said applying further comprises comparing said feedbacking information about said at least two messages subject to initial surveying and selecting one for said widespread distribution-publishing.

11. The method as set forth in claim 9, wherein said message is a combination of a message and metadata, wherein said metadata comprising at least one feedbacking parameter related to said message, to be actively replied by a watcher in said notification list, wherein said interacting comprises interacting with said metadata of said message.

12. The method as set forth in claim 9, wherein said interacting comprises an action, selected from the group consisting of: an active action and passive action; said action is exerted onto said message in a way selected from the group consisting of: directly thereon and indirectly thereto; wherein said action pertains to a value selected from the group consisting of: a qualitative value and quantitative value.

13. The method as set forth in claim 9, wherein said interacting is at least one action selected from the group consisting of: ignoring said message, rejecting said message; blocking a publisher of said message, blacklisting said publisher, not opening said message, deleting said message, opening said message, scrolling through said message body, opening hyperlinks embedded in said message, open any files attached to said message, replying to said message, forwarding said message, performing a copy operation to at least a portion of said message, changing an appearance of said message, changing font size, deleting said presentity, sharing said message with others, publishing said message, making a purchase as a result of said message, saving said message, ranking said message, opening up an application, arriving within a predefined radius of a geographical location, powering off said presence-messaging user agent module.

14. The method as set forth in claim 9, wherein prior to said distribution-publishing of said at least one message subject to said initial surveying said surveying server performs at least one action selected from the group consisting of:
   [a] obtaining a permission from publisher for of said distribution-publishing;
   [b] notifying said publisher with results of said survey;
   [c] notifying said publisher with statistical analysis of said survey;
   [d] providing an option to define a selection parameter for inclusion in said distribution-publishing.

15. The method as set forth in claim 9, further comprises storing said at least message notified to said predefined group of watchers in a notification history database.

16. The method as set forth in claim 9, further comprises selectively excluding from said distribution-publishing watchers in said notification list.

* * * * *